United States Patent [19]

Tacussel

[11] 3,883,810

[45] May 13, 1975

[54] DEVICE FOR THE USE IN FREQUENCY OF A SHORT DURATION ELECTRICAL SIGNAL

[75] Inventor: Maurice Tacussel, Boulogne-Billancourt, France

[73] Assignee: Electronique Marcel Dassault, Paris, France

[22] Filed: May 16, 1973

[21] Appl. No.: 360,849

[30] Foreign Application Priority Data

May 26, 1972 France .............................. 72.18964

[52] U.S. Cl. .................. 328/155; 307/295; 328/55; 328/56; 328/92 CL

[51] Int. Cl. ............................................. H03b 3/08

[58] Field of Search ........... 328/92 CL, 55, 56, 155; 307/295

[56] References Cited

UNITED STATES PATENTS

| | | | |
|---|---|---|---|
| 2,736,021 | 2/1956 | Sunstein | 343/17.2 |
| 2,841,704 | 7/1958 | Sunstein et al. | 250/27 |
| 2,987,253 | 6/1961 | Schreiner et al. | 235/176 |
| 3,044,017 | 7/1962 | Lewis | 328/92 |
| 3,076,180 | 1/1963 | Havens et al. | 340/173 |
| 3,077,564 | 2/1963 | Forrer | 328/92 |

*Primary Examiner*—Andrew J. James
*Assistant Examiner*—Joseph E. Clawson, Jr.
*Attorney, Agent, or Firm*—Hane, Baxley & Spiecens

[57] ABSTRACT

Apparatus for storing pulses consisting of packets of high frequency alternating signals including a closed recirculating loop which has a controllable phase shifter therein to insure that the phase of the signals removed from the loop is the same as those introduced into the loop.

7 Claims, 5 Drawing Figures

DEVICE FOR THE USE IN FREQUENCY OF A SHORT DURATION ELECTRICAL SIGNAL

The present invention relates to a device for the use in the frequency processing of a short duration electrical signal.

It is sometimes desired, in the field of ultra-high frequencies and radar techniques, to be able to process the frequency of a short duration electrical signal at varying times after the signal has ceased. For this purpose, it has already been proposed to apply the signal to a plurality of parallel-connected delay lines of differing lengths corresponding to the times when it is desired to frequency process the signal being used; however, these lines only enable the signal to be operated at discontinuous delay intervals. In addition application is complex and costly.

It has also been proposed to use the passage of the signal through a closed loop wherein the signal is introduced at one point and extracted at the same point after it has passed through the loop. However, outputting can only take place at predetermined time intervals corresponding to the time taken for the signal to pass through the loop. Furthermore, the loop must be sufficiently long for the time taken to pass through it to exceed the duration of the longest of the signals received, as the incident waves would otherwise overlap in the loop with the circulating waves.

It is a general object of the invention to provide a device for use in the frequency processing of a short duration electrical signal of the type comprising a closed recirculation loop which remedies the drawbacks mentioned in known devices.

It is also an object of the invention to provide such a device that is suitable for enabling a short duration electrical signal to be used in frequency for a time that is relatively long with respect to the duration of the signal.

The device according to the invention, which includes a closed loop at a point of which a signal is introduced, and picked at said point after passing through the loop, is characterized in that it includes means for adapting the circulation time in the loop to the frequency of the introduced signal so that the circulating waves are in phase with the incident wave.

According to one embodiment of the device of the invention, the loop includes variable phase-shift means, actuated as a function of the phase comparison between the wave of the signal introduced and the wave of the signal delayed by a determined fraction of the delay time introduced by the loop.

In a preferred embodiment, the phase-shift means are downstream, — in signal circulation direction —, from delay lines or analogous means introducing a delay T, and phase-shift measurement takes place between the wave of the incident signal and that of the signal delayed by a time T/2.

The invention is further characterized by the fact that it makes use of phase-shifters providing predetermined phase-shift intervals, advantageously rapid P.I.N. diode actuated Schiffman type phase-shifters.

The invention also relates to a mode of execution characterized in that first means for adjusting the time taken for signals to pass through the loop as a function of the frequency of the signal introduced into the loop and operational during the first passage through the loop, are combined with second means for adjusting the time taken for the signal to pass through the loop during a second passage by comparison of the wave phase of the signal circulating through the loop already adapted during the first passage with the incident wave.

In one embodiment for frequency processing a short duration electrical signal at a moment relatively remote from that at which the signal is received in relation to its duration, for example in the case of a signal with a duration of the order of 100 nanoseconds and that has to be used at a given moment after it appears, provision is made for combining a first device as above-defined with a VCO type oscillator whose frequency is set to that of such device by a phase locking circuit, together with means for fixing such oscillator to a predetermined frequency adjacent to that of the signal to be used and generated by means of a second device of the above defined type.

In the following description, given for the purpose of example, reference is made to the accompanying drawing wherein.

Figure 1:
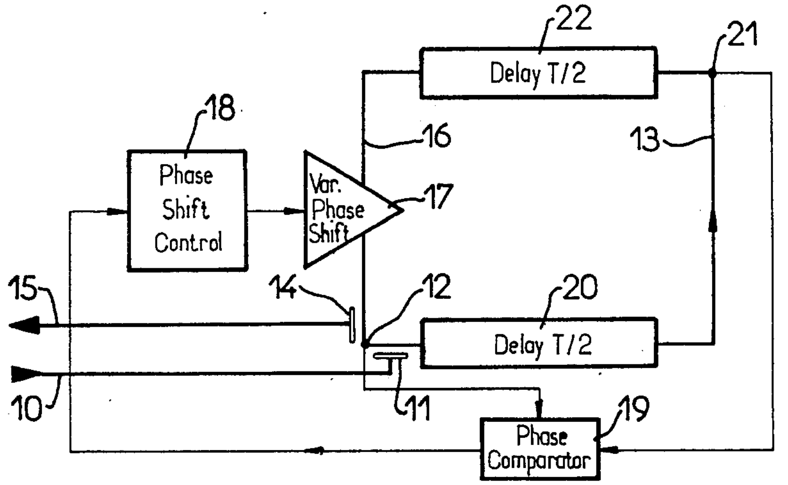
FIG. 1 is a block diagram of a first embodiment of a device according to the invention.

FIG. 1 diagrammatically represents a device according to the invention. In this device, the short duration electrical signal whose frequency is to be used, for example a high frequency signal with a duration of a hundred or so nanoseconds, enters at input 10 and is applied by means of a directional coupler 11 at a point 12 of a closed loop 13 in which there is a second directional coupler 14 connected to an operating output 15. A delay line or analogous device 20, producing a delay T/2 and a delay line or analogous device 22 also producing a delay T/2 are inserted into loop 13, so that the loop introduces a total delay T.

According to the invention, section 16 or loop 13, which is the last to be traversed by the signal introduced through coupler 11, comprises a variable phase-shifter 17 suitable for actuation by means 18. The latter is connected to a phase comparator 19 inserted between point 12 on the loop and point 21 half way around it, i.e., between delay lines 20 and 22.

When, upon arrival of a signal having a given frequency within the frequency range of the device, phase comparator 19 detects, between the signals tapped at points 12 and 21, a phase-shift $\Delta\phi$ given by:

$$\Delta\phi = \omega\ (T/2),$$

where $\omega$ is the frequency of the signal, it actuates means 18 so that device 17 introduces a phase-shift in the loop such that the entire loop produces a phase-shift equal to a multiple of $2\pi$. When the wave that has once travelled through loop 13 arrives at point 12, it is thus in phase with the signal introduced at this point by coupler 11. Hence, in-phase waves resulting both from the circulating waves and from that of the signal introduced into the loop by coupler 11 pass through the loop. The circulating waves can be used after the initial short duration signal has disappeared. They possess the latter's frequency and can be frequency processed at a moment $t$ comprised between $to$ and $to + nT$ if $to$ is the moment at which the signal is introduced into loop 13 and $n$ the number of signal circuits through said loop.

In one embodiment, variable phase-shifter 17 is constituted by a series of cells introducing phase-shift values which vary according to a geometrical progression of ½.

Comparator 19 is then of the digital type and if $\Delta\phi$ is the phase-shift that it measures, it enables:

$\sin(\Delta\phi - 45°)$ and $\cos(\Delta\phi - 45°)$ and then:

$\sin(\Delta\phi - 22.5°)$ and $\cos(\Delta\phi - 22.5°)$ to be determined after determining $\sin \Delta\phi$ and $\cos \Delta\phi$, the value of $\Delta\phi$ being determined by successive approximations, first from 0 to $\pi$ or from $\pi$ to $2\pi$, and then by quadrants, and then half-quadrants, etc., the different approximations successively operating the different cells of variable phase-shift 17.

Figure 2:
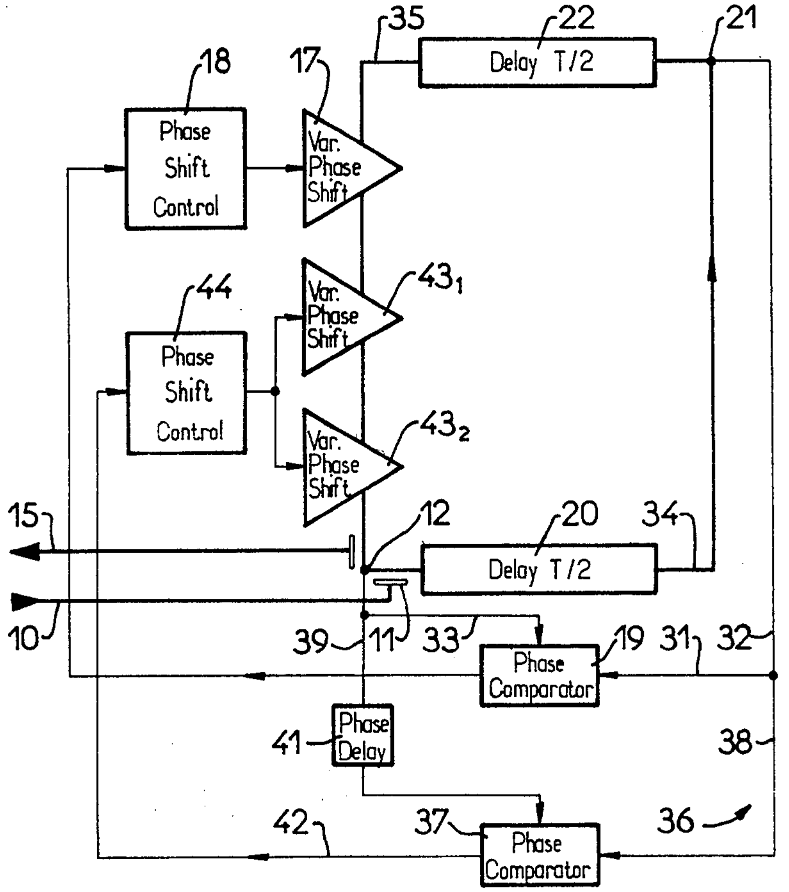
FIG. 2 is a block diagram analogous to that in FIG. 1 but for another embodiment.

With reference now to FIG. 2, in order to avoid a large number of sin and cos additions for another circuit, provision is made, in addition to the first circuit 31 comparing the phases of the signal introduced into the loop at point 12 and that sampled signal at point 21. This other circuit comprises a phase comparator 19 connected by equal paths 32 and 33 to points 12 and 21 on loop 13 equidistant along paths 34 and 35, a second phase comparing circuit 36 including a second phase comparator 37 connected to points 12 and 21 by paths 38 and 39 of the same length, on one of which is interposed a delay device 41 causing a phase delay exactly equal to half the smallest correction angle fraction introduced by phase-shifter 17, i.e., 11.25° in the example.

The data at output 42 of phase comparator 37 is used for adapting the time taken for signals to pass through loop 13 by selectively introducing into the loop phase-shifters $43_1$, $43_2$ actuated by means 44 connected to comparator 37 so that, with the desired approximation, a circulating wave in-phase with the wave of the signal introduced into the loop by coupler 11 is obtained.

Figure 3:
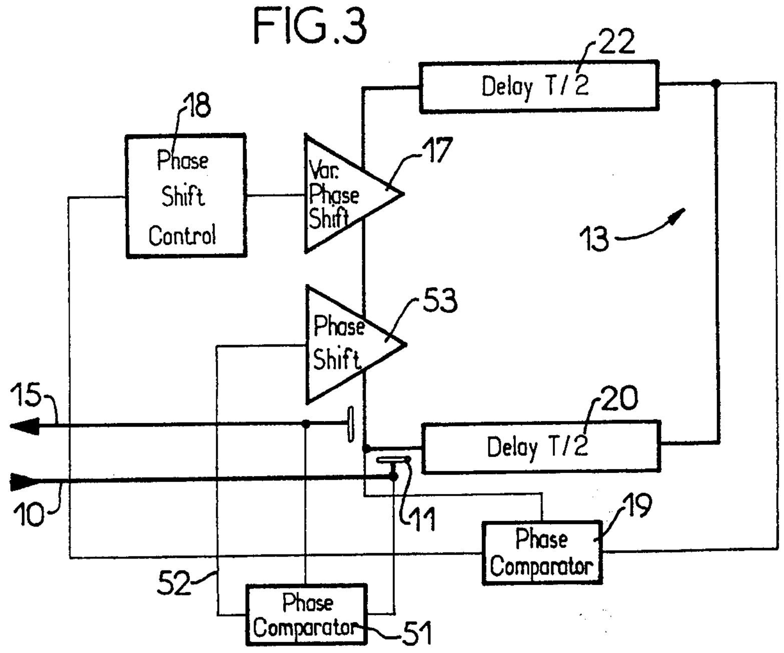
FIG. 3 is a block diagram analogous to those in FIGS. 1 and 2 but for yet another embodiment.

With reference now to FIG. 3 relating to another embodiment of the device according to the invention, loop 13 through which high frequency signals pass includes phase shifting means 17 actuated as already indicated by a device 18 from a phase comparator 19 or a set of phase comparators 19 and 42 as described with reference to FIG. 2. In addition, in this embodiment, the phase of the circulating wave that has completed one circuit of the loop is compared in another phase comparator 51 with the wave of the signal introduced into the loop through directional coupler 11. The result of the comparison supplied at output 52 of comparator 51 is applied to a phase-shifting device 53 which introduces the corrective complement. In this way, the desired accuracy is obtained, the phase comparator 51 enabling the defects and errors induced by the whole of loop 13 in the signals passing through it to be taken into account. This embodiment is advantageous for frequency operation of an electrical signal or pulse that is relatively long, such as narrow pass-band radar pulses.

Figure 4:
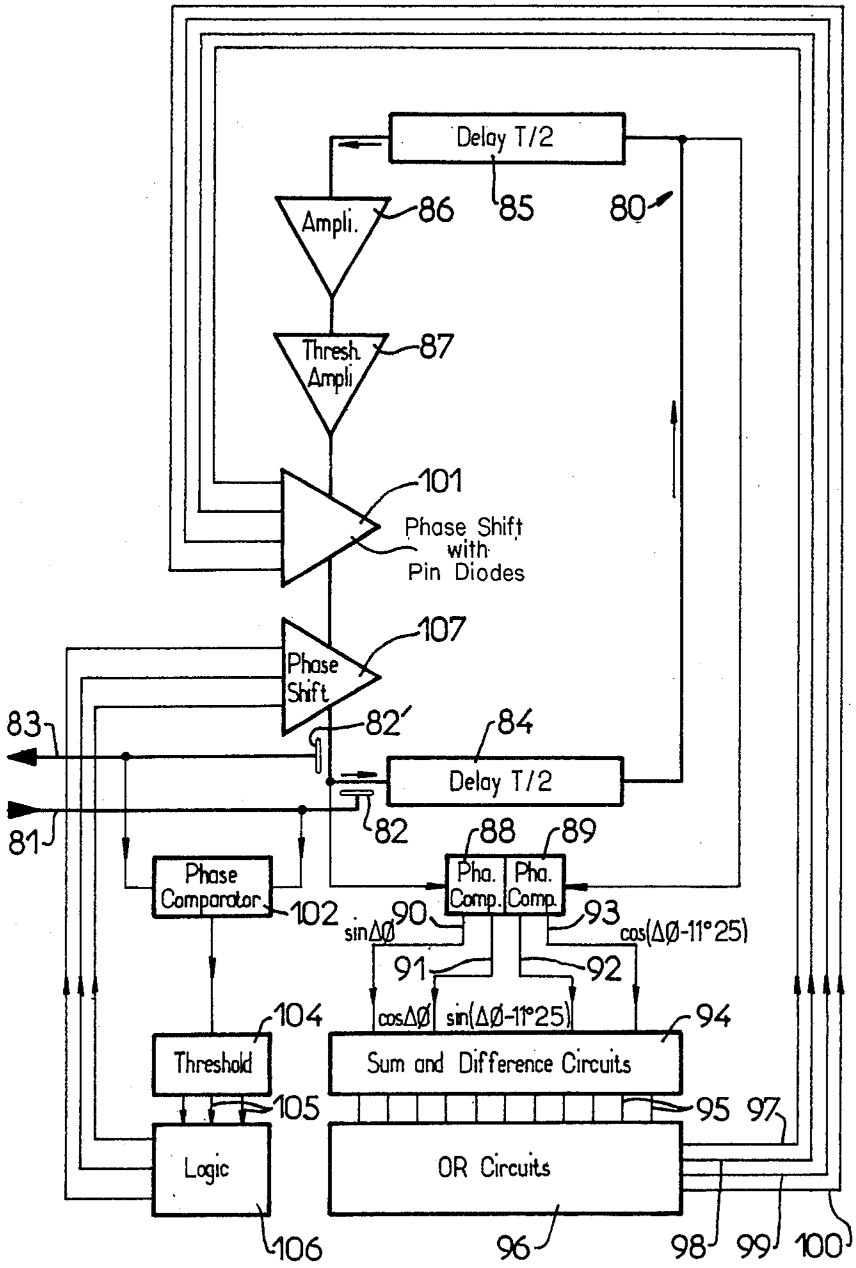
FIG. 4 is a more complete block diagram of a device according to the invention.

FIG. 4 represents a device according to the invention of the type diagrammatically represented in FIG. 3. It includes a closed loop 80 through which passes a high frequency signal present at input 81 and introduced into the loop through a directional coupler 82, the signal whose frequency is to be used being picked up at an output 83 by a coupler 82′. The loop 80 comprises delay lines 84 and 85 each introducing a delay T/2 and advantageously constituted by coaxial cable having stable electrical and mechanical characteristics to undergo identical variations under the effect of temperature. Downstream of the delay lines, in the signal circulation direction, the loop includes a limiter-amplifier 86 whose saturation gain as a function of frequency is free of anomalies in order to prevent noise from being amplified. The amplifier is followed by a threshold amplifier 87, whose gain is variable as a function of the input signal level, with, more precisely, low gain for a low power input signal and higher gain for a high power input signal in order to limit noise circulating through loop 80.

Two phase comparators 88 and 89 are connected to the terminals of delay line 84, at whose input is introduced the signal to be used in frequency, the phase comparators supplying at their outputs 90–91 and 92–93 respectively signals representing:

$\sin \Delta\phi$, $\cos \Delta\phi$, and $\sin(\Delta\phi - 11.25°)$, $\cos(\Delta\phi - 11.25°)$ if $\Delta\phi$ is the phase-shift measured. Comparators 88 and 89 are combined with circuits 94 finding the sum and difference of the signals applied to their inputs through channels 90–93 to supply at their output 95 signals representing:

$\sin \Delta\phi$, $\sin(\Delta\phi - 22.5°)$,
$\cos(\Delta\phi - 22.5°)$, $\sin(\Delta\phi - 45°)$, $\cos(\Delta\phi - 45°)$
and $\sin(\Delta\phi - 11.25°)$, $\sin(\Delta\phi - 33.75°)$, $\cos(\Delta\phi - 11.25°)$,
$\cos(\Delta\phi - 33.75°)$, $\sin(\Delta\phi - 56.25°)$, $\cos(\Delta\phi - 56.25°)$ said signals being supplied, after amplification and shaping, to an "exclusive-OR" or logic device 96 whose outputs 97–100 actuate a phase-shifter 101 with four cells 0—$\pi$, 0—$\pi/2$, 0—$\pi/4$, 0—$\pi/8$ of the Schiffman type, controlled by fast P.I.N. diodes.

A third phase comparator 112 provides the corrective complement in relation to that supplied by phase-shifter 101. It measures phase-shift between the wave of the signal to be used and the wave that has completed one circuit of loop 80, its output 103 being connected to a threshold device 104 whose outputs 105 control a logic device 106 suitable for operating a phase-shifter 107, constituted in the same way as phase-shifter 101, for introducing phase-shift values with respective intervals of 0° ± 5°, 0° ± 10°, 0° ± 15° into loop 80.

Figure 5:
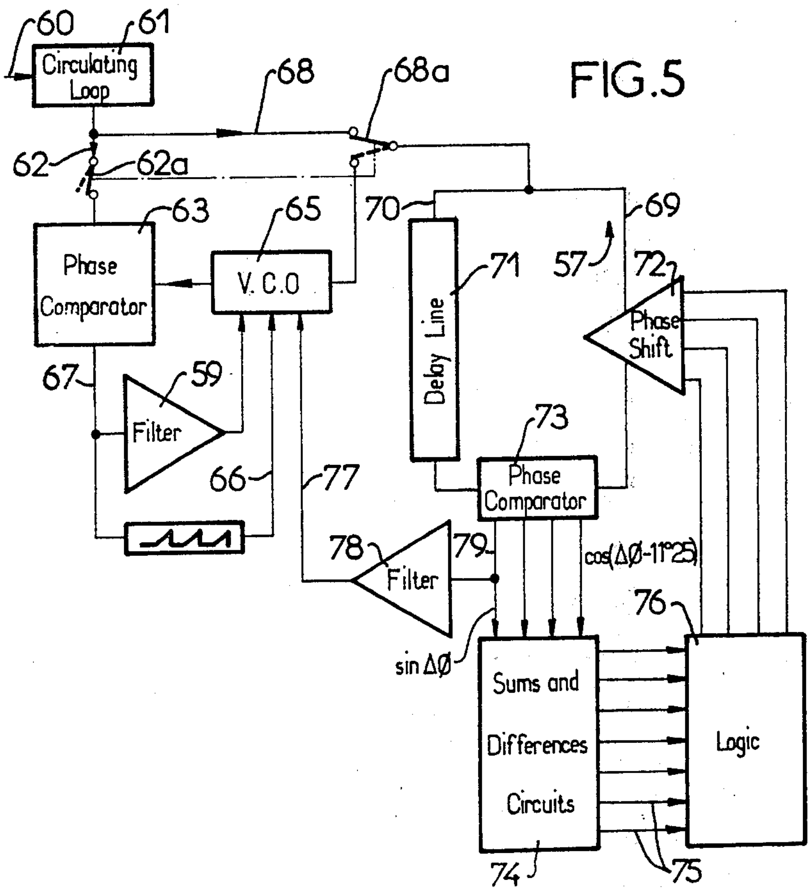
FIG. 5 is a block diagram of a device according to the invention for use in frequency of a short duration electrical signal at a given moment after said signal has been received.

Reference is now made to FIG. 5 relating to an embodiment of a device according to the invention enabling a short duration electrical signal to be frequency operated at a given moment after reception. The device according to this embodiment includes a device 61 as above described, with a loop through which signals pass and means for adapting the time taken to pass through said loop. On the basis of a signal lasting for example 0.1 microseconds applied to its input 60, this device makes it possible to obtain a circulating wave with the same frequency for a substantially longer time, for example 10 microseconds. From device 61, the circulating wave is applied through a first channel 62 provided with a switch 62*a* to a phase comparator 63 whose other input 64 is connected to an oscillator 65 whose frequency is electronically or VCO controlled, the control factor being a sawtooth signal applied through channel 66. Output 67 of comparator 63, after passing through an active filter 59, is applied to oscillator 65 so as to lock the latter onto the frequency of the signal to be used.

A second channel 68 from device 61 is suitable for connection by a switch 68*a* ganged with switch 62*a* to a circuit 57 including, on the one hand, a first branch 69 without a delay line and having a phase shifter 72 of a type analogous to that in device 61 and, on the other hand, a second branch 70 with a delay line 71 whose delay value is of the order of 1 microsecond. Arms 70 and 69 form the inputs of a phase comparator 73 whose outputs representing sin $\Delta\phi$, cos $\Delta\phi$, sin $(\Delta\phi - 11.25°)$, and cos $(\Delta\phi - 11.25°)$ are introduced into a device 74 which, by supplying the sums and differences of its input signals, transmit at its outputs 75 signals controlling a logic circuit 76 suitable for actuating phase-shifter 72 possessing cells $0-\pi$, $0-\pi/2$, $0-\pi/4$, $0-\pi/8$.

In a first operating phase, with switch 62*a* closed and switch 68*a* connecting channel 68 to circuit 57 (position represented by a continuous line in FIG. 5), the frequency of the signal from VCO oscillator 65 is set to that of the wave travelling through device 61. During a second phase, with switch 62*a* open and switch 68*a* connecting oscillator 65 to circuit 57 (position represented by a dot and dash line), loop 57 whose preferred frequency is adapted to that of the signal to be operated, plays the part of a phase discriminator, so that VCO 65 is frequency controlled from said loop 57 by a channel 77 with an active filter 78 connected to the output 79 of the phase comparator 73 which emits the signal representing sin $\Delta\phi$.

Whereas, in the devices in FIGS. 1 to 4, passage of the signal through the delay line loop is limited to a hundred or so runs, owing to noise amplification, the device that has just been described enables the frequency of the electrical signal to be used to be available for an unlimited time.

The device according to the invention can be used particularly in a radar counter-measuring installation.

What is claimed is:

1. A device for storing a short duration signal comprising a read-in-station having an input means for receiving the signal, a read-out-station having an output means for transmitting the signal, a first signal delay means, a second signal delay means, said stations and said delay means being serially connected to form a closed signal-recirculation loop with said second signal delay means being located to receive the signals from said first signal delay means, phase comparator means connected to said read-in-station and to a point of said loop between said first and second delay means, means for adjustably phase shifting a signal circulating between said read-out-station and said second delay means, and phase shift control means coupling said phase comparator means and said means for adjustably phase shifting the circulating signal, whereby the transit time around the loop of the circulating signal is so controlled as to provide at the read-out-station a signal in phase with the signal introduced at the read-in-station.

2. A device according to claim 1 wherein said first and second delay means introduce the same delay on the circulating signal.

3. A device according to claim 1 wherein said means for adjustably phase shifting the circulating signal includes a phase shifter controlled by rapid semiconductor diodes consisting of a P-type semiconductor region, an intrinsic semiconductor region, and an N-type semiconductor region.

4. A device according to claim 1 wherein said means for adjustably phase shifting the circulating signal comprise first phase shifting means rendered operative during a first circulation of the signal in the loop and second phase shifting means rendered operative during circulation in the loop of the signal which has been phase shifted during the first circulation in the loop.

5. A device according to claim 4 further comprising means for generating the sum and the difference of the signals emitted by said phase comparator means, a first logic circuit coupling the output of said sum and difference generating means to said means for adjustably phase shifting said circulating signal, a second phase comparator means connected between said input and output means, and a second logic coupling the output of said second comparator to said second phase shifting means for adjustably phase shifting the circulating signal.

6. A device according to claim 5 further comprising a limiter ampilfier and a threshold amplifier between said second delay means and said first phase shifting means for adjustably phase shifting said circulating signal.

7. A device for frequency processing a short duration signal comprising:

a. a first recirculating signal loop having a read-in-station with an input means for receiving the signal and a read-out-station with an output means for transmitting the signal, distinctly located first and second delay means in said loop, said second delay means being downwstream of said first means in the sense of circulation of the signal along said loop, phase comparator means connected to said read-in-station and to a point of said loop between said first and said second delay means, means for adjustably phase shifting said circulating signal between said read-out-station and said second delay means and phase shift control means coupling said phase comparator means and said means for adjustably phase shifting the circulating signal;

b. a voltage controlled oscillator;

c. means for adjusting said voltage controlled oscillator to the frequency of the signal received at said read-out-station;

d. a second recirculating signal loop selectively coupled to said read-out-station and to said voltage controlled oscillator, said second loop including third delay means and another phase comparator means connected to said read-out-station and to said third delay means, third means for adjustably phase shifting the signal circulating in said second loop, phase shift control means coupling said phase comparator means and said third means for adjustably phase shifting the circulating signal; and e. means for adjusting said voltage controlled oscillator to a predetermined frequency, close to that of the signal which is to be frequency processed when transmitted from said read-out-station.

* * * * *